United States Patent
Traxl et al.

(10) Patent No.: US 10,633,791 B2
(45) Date of Patent: Apr. 28, 2020

(54) STEEL CABLE

(71) Applicant: TEUFELBERGER SEIL GESELLSCHAFT M.B.H., Wels (AT)

(72) Inventors: Robert Traxl, Ebensee (AT); Gunter Kaiser, Thalheim bei Wels (AT)

(73) Assignee: TEUFELBERGER SEIL GESELLSCHAFT M.B.H., Wels (AT)

(*) Notice: Subject to any disclaimer, the term of this patent is extended or adjusted under 35 U.S.C. 154(b) by 0 days.

(21) Appl. No.: 16/099,738

(22) PCT Filed: May 8, 2017

(86) PCT No.: PCT/AT2017/060120
§ 371 (c)(1),
(2) Date: Nov. 8, 2018

(87) PCT Pub. No.: WO2017/193149
PCT Pub. Date: Nov. 16, 2017

(65) Prior Publication Data
US 2019/0186073 A1    Jun. 20, 2019

(30) Foreign Application Priority Data

May 9, 2016   (AT) .............................. A 50427/2016

(51) Int. Cl.
*G02B 6/44*     (2006.01)
*D07B 1/14*     (2006.01)
(Continued)

(52) U.S. Cl.
CPC ............. *D07B 1/145* (2013.01); *D07B 1/165* (2013.01); *D07B 5/007* (2013.01); *D07B 7/027* (2013.01);
(Continued)

(58) Field of Classification Search
CPC ..................................... G02B 6/44; D07B 1/14
(Continued)

(56) References Cited

U.S. PATENT DOCUMENTS

| 3,530,661 A | 9/1970 | Thomen |
| 4,466,697 A * | 8/1984 | Daniel .................. A47G 19/16 |
| | | 385/123 |

(Continued)

FOREIGN PATENT DOCUMENTS

| DE | 10 2004 009797 A1 | 9/2005 |
| EP | 0 538 779 A2 | 4/1993 |

(Continued)

OTHER PUBLICATIONS

International Search Report of PCT/AT2017/060120, dated Aug. 8, 2017.

*Primary Examiner* — Kaveh C Kianni
(74) *Attorney, Agent, or Firm* — Collard & Roe, P.C.

(57) ABSTRACT

A steel cable includes steel wires and at least one light wave guide which is surrounded by the steel wires and provided for detecting load-dependent cable strains, and has a glass fiber surrounded by a plastic casing. At least the steel wires closest to the light wave guide are crimped with the light wave guide and permanently pressed against the casing surface thereof, whereby the cross-sectional shape of the casing surface of the light wave guide deviates from an unloaded shape, in particular a circular shape, and the light wave guide is clamped continuously along at least one part of the longitudinal extension thereof, in a slip-free manner between the steel wires closest to same. A method produces a steel cable of this type.

12 Claims, 2 Drawing Sheets

(51) Int. Cl.
  *G01L 5/105* (2020.01)
  *D07B 7/02* (2006.01)
  *D07B 5/00* (2006.01)
  *D07B 1/16* (2006.01)
  *G01D 5/353* (2006.01)
  *G01B 11/16* (2006.01)

(52) U.S. Cl.
  CPC ............ *G01L 5/105* (2013.01); *G02B 6/4415* (2013.01); *D07B 2201/2019* (2013.01); *D07B 2201/2096* (2013.01); *D07B 2301/259* (2013.01); *D07B 2301/5577* (2013.01); *D07B 2401/205* (2013.01); *D07B 2501/2007* (2013.01); *G01B 11/18* (2013.01); *G01D 5/3537* (2013.01)

(58) Field of Classification Search
  USPC ........................................................ 385/145
  See application file for complete search history.

(56) References Cited

U.S. PATENT DOCUMENTS

| | | | | |
|---|---|---|---|---|
| 5,154,705 A | * | 10/1992 | Fleischhacker | A61B 17/3207 600/585 |
| 5,165,421 A | * | 11/1992 | Fleischhacker | A61B 17/3207 138/130 |
| 5,182,779 A | | 1/1993 | D'Agostino et al. | |
| 5,825,957 A | * | 10/1998 | Song | G02B 6/4407 385/113 |
| 6,052,184 A | * | 4/2000 | Reed | G01N 15/0211 356/337 |
| 6,210,395 B1 | * | 4/2001 | Fleischhacker | A61B 17/3207 604/523 |
| 6,504,980 B1 | * | 1/2003 | Gaillard | G02B 6/443 385/112 |
| 6,999,641 B2 | | 2/2006 | Williams et al. | |
| 7,351,202 B2 | * | 4/2008 | Long | A61B 1/00133 600/104 |
| 2001/0021831 A1 | * | 9/2001 | Fleischhacker | A61B 17/3207 604/264 |
| 2005/0078922 A1 | | 4/2005 | Sanders et al. | |
| 2008/0008430 A1 | * | 1/2008 | Kewitsch | G02B 6/4478 385/113 |
| 2008/0255629 A1 | * | 10/2008 | Jenson | A61B 5/1107 607/19 |
| 2014/0112630 A1 | * | 4/2014 | Hennink | G02B 6/44 385/113 |
| 2015/0141854 A1 | * | 5/2015 | Eberle | A61B 5/02154 600/488 |

FOREIGN PATENT DOCUMENTS

| | | |
|---|---|---|
| EP | 1 970 487 A2 | 9/2008 |
| GB | 2 144 779 A | 3/1985 |
| GB | 2 175 323 A | 11/1986 |
| GB | 2 199 961 A | 7/1988 |

\* cited by examiner

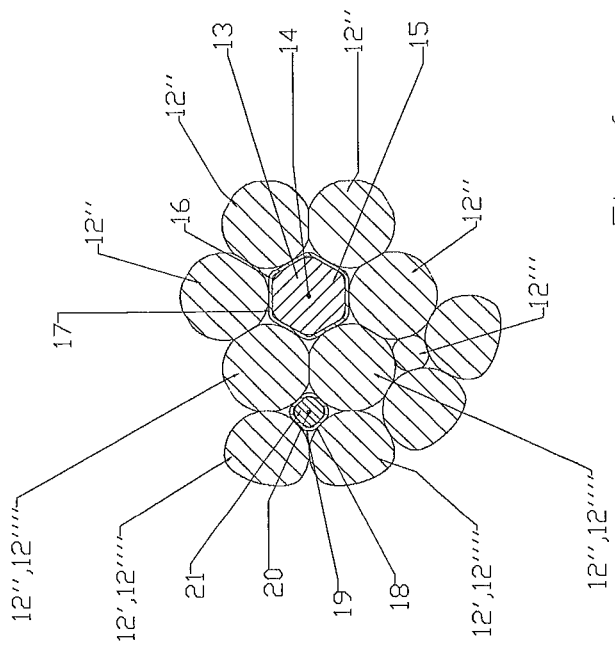
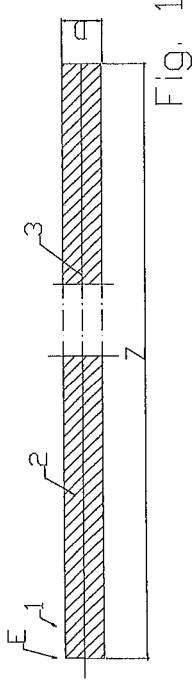
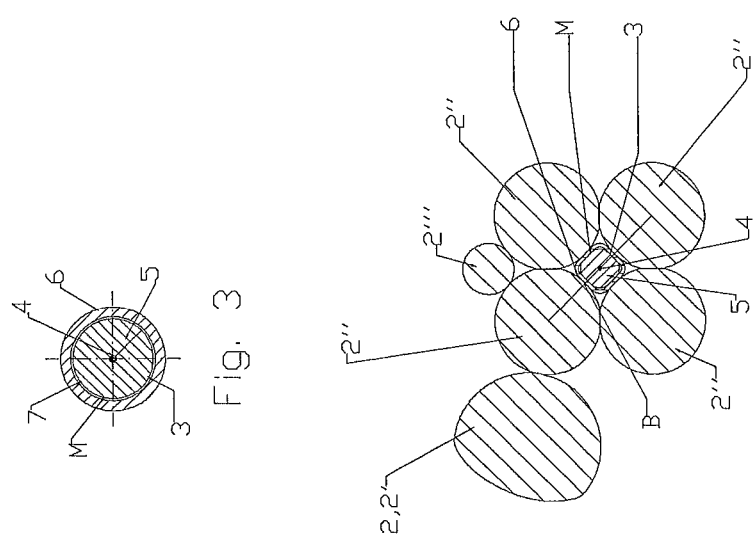

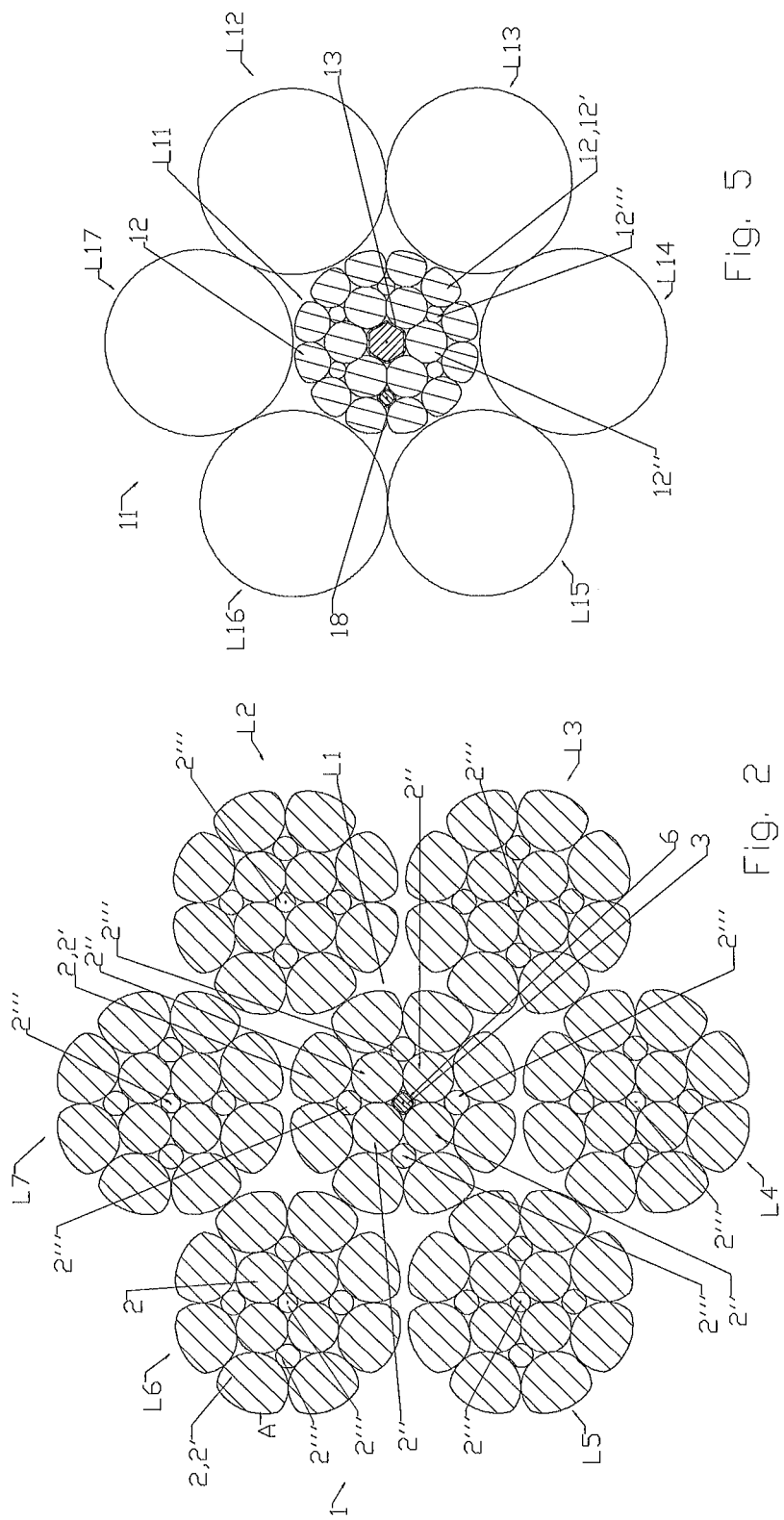

STEEL CABLE

CROSS REFERENCE TO RELATED APPLICATIONS

This application is the National Stage of PCT/AT2017/060120 filed on May 8, 2017, which claims priority under 35 U.S.C. § 119 of Austrian Application No. A 50427/2016 filed on May 9, 2016, the disclosure of which is incorporated by reference. The international application under PCT article 21(2) was not published in English.

The invention relates to a steel cable with steel wires and with at least one light wave guide surrounded by the steel wires and provided for detecting load-induced cable elongations, which light wave guide comprises a glass fiber surrounded by a plastic sheath.

The invention also relates to a method for producing a steel cable with steel wires and with at least one light wave guide provided for detecting load-induced cable elongations, which light wave guide comprises a glass fiber surrounded by a plastic sheath.

Known in the art is to provide cables, in particular also steel cables, with a light wave guide fixedly arranged therein, which preferably undergoes the same strain (elongation) as a cable when said cable is exposed to a tensile load. Suitable, known measuring methods, for example in optical time-domain reflectometry (OTDR) or optical frequency-domain reflectometry (OFDR), are used to acquire load states in the light wave guide, and thus in the cable, and these measuring results can be used to infer weak points in the cable, for example cable breakages, or the discard criteria of the cable. As a consequence, the cable can be replaced in time before it fails. Essential for this purpose is that the light wave guide be fastened in the cable in a slip-free manner.

U.S. Pat. No. 6,999,641 B2 discloses a plastic cable with a light wave guide made out of plastic for acquiring the cable elongation and estimating the remaining cable service life by means of OTDR or OFDR. The light wave guide has a sheath made of hard plastic, which displaceably incorporates the light wave guide in an unloaded state, while an axial force acting on the cable causes the sheath to be laterally crimped by means of an additional cable braided around the sheath, thereby clamping the light wave guide in a slip-free manner. As a consequence, the light wave guide is not permanently fixed in the cable. In addition, the specially provided braided cable is arranged in the cable, which in particular in long cables increases the complexity, production outlay and costs thereof.

EP 0 538 779 A2 discloses a steel cable to be monitored with several wires, which surround a tubular core rod or core wire, in which is arranged a light wave guide for monitoring the cable for elongation or damage. In order to fixedly connect the light wave guide with the core wire, it can be adhesively bonded in the core wire. However, the adhesive bonding process is complicated and not necessarily reliable enough in particular in long cables for fixing the light wave guide along its entire longitudinal extension in the core wire, and in particular in the cable.

U.S. Pat. No. 5,182,779 discloses a system with a measuring device for acquiring elongations of a wire cable, for example for elevators. For example, the cable has parallel wires, between which a glass fiber is accommodated. The parallel wires are also wound with binding elements. In like manner, an encased glass fiber can be adhesively bonded with the wires of the cable. It is here questionable as well whether the light wave guide can be fixed reliably and cost-effectively along the longitudinal extension of the cable.

EP 1 970 487 A2 and GB 2 175 323 A describe wire cables with light wave guides provided for signal or data transfer.

The object of the invention is now to create a steel cable as indicated at the outset that contains a light wave guide for measuring the elongation (strain) of the cable as reliably and precisely as possible. In particular, the arrangement of the light wave guide in the cable is to enable an elongation measurement with a high spatial resolution along the cable. To this end, the light wave guide is to be permanently and fixedly secured in the cable.

It is further the object of the invention to create a method as indicated at the outset, which enables a cost-effective production of the cable and a reliable fixation of the light wave guide in the cable.

For this purpose, the invention provides a steel cable as described herein and a method as described herein. Advantageous embodiments and further developments are also described herein.

The invention provides that at least the steel wires closest to the light wave guide are crimped with the light wave guide and permanently press against its sheath surface, as a result of which the cross sectional shape of the sheath surface of the light wave guide deviates from an unloaded shape, in particular from a circular shape, and the light wave guide is clamped continuously between the steel wires closest to it in a slip-free manner along at least a part of its longitudinal extension. The steel cable, whose state and/or reliability are to be monitored by means of a measuring process that assumes a light wave guide, comprises steel wires for absorbing the cable load, which steel wires surround the light wave guide. It is here favorable, although not absolutely necessary, that the light wave guide is arranged in the middle of the cable as viewed in the cross section of the cable, and thus is especially reliably protected against damage. As a result of the above along with a preferred symmetrical arrangement of the steel wires surrounding the light wave guide, which symmetrically introduce a retaining force into the latter, the light wave guide is also loaded in essentially a uniform manner in the radial direction. The light wave guide itself comprises a glass fiber as the light-conducting body, thereby facilitating especially precise measurements of the elongation placed on the light wave guide by loading the cable. Glass fibers are suitable in particular for elongation measurements based on the principle of Rayleigh scattering or Brillouin scattering. For example, scanning the Rayleigh scattering along the glass fiber enables spatial resolutions of the elongation measurement in the millimeter range, and thus especially precise evidence about local weak points or damages, for example wire breakages, in the cable. The glass fiber is surrounded by a flexible plastic sheath to protect the glass fiber against damage.

In order to transfer the cable elongations to be detected to the light wave guide as unchanged as possible, the latter is essentially non-displaceably accommodated between the steel wires. This is accomplished in that at least the steel wires closest to the light wave guide are crimped with the light wave guide and permanently press against its sheath surface. Of course, steel wires further away from the light wave guide, which abut against the steel wires closest to the light wave guide, can be crimped with the light wave guide and thereby permanently press against its sheath surface. The cable is compressed by the crimping. An excessive pressure could increase the damping of the glass fiber to such an extent that the measurement of light signals in the light wave guide provided for acquiring the elongation cannot be reliably performed, in particular for large cable lengths of several hundred to several thousand meters. The value for the pressure acting on the sheath surface will be selected that the light wave guide will be reliably retained in the cable on the one hand, and that the glass fiber will only be deformed so slightly as to not appreciably deteriorate the damping properties of the glass fiber on the other hand. The precise expedient extent of compression or crimping depends among other things on the used materials and dimensions of the glass fiber, of the plastic sheath and of the steel wires, as well as on the intended use of the cable, and must be selected accordingly by an expert. Let it be noted that not just any glass fiber is suitable for crimping with the steel wires for acquiring the cable elongation. In particular, the glass fiber itself must have sufficient elongation properties in its longitudinal direction so as not to break both during crimping, which leads to an elongation of the light wave guide, and when exposed to a cable load.

As a result of crimping, the cross sectional shape of the sheath surface of the light wave guide deviates from an unloaded shape in the crimping area. Since the sheath surface of the light wave guide generally has a circular cross section in the unloaded state, i.e., prior to crimping with the steel wires, the sheath surface of the light wave guide fixedly accommodated between the steel wires deviates in cross section from the circular shape in the crimping area, preferably along the entire longitudinal extension of the light wave guide. In particular the sheath surface can be flattened or impressed in the contact area of the steel wires closest to the light wave guide. To enable a precise elongation acquisition, the light wave guide is crimped with the steel wires closest to it in the cable section to be monitored, in particular also in the entire cable, along at least a portion of its longitudinal extension, in particular along its entire longitudinal extension. As a consequence, the light wave guide is continuously clamped in a slip-free manner, i.e., non-displaceably, between the steel wires closest to it in the cable section to be monitored or in the entire cable. The pressure applied by the steel wires closest to the light wave guide on the sheath surface here causes that the light wave guide is fixed in the cable by force-fit. Since the steel wires deform the sheath surface at least in the area where they rest against the sheath surface, the light wave guide is additionally fixed in the cable by force-fit.

Let it be noted that it can be enough in specific applications that the cable elongation be acquired as precisely as possible in only one section of the steel cable. In this case, for example, the light wave guide can have a lower longitudinal extension than the steel cable. In addition, the light wave guide can in this instance be fixedly and permanently clamped or crimped with the steel wires in only the section where the cable elongation is to be acquired. At any rate, this type of structural design lies within the framework of the invention. However, it is especially expedient that the light wave guide be crimped along the entire longitudinal extension of the steel cable.

In a preferred embodiment of the invention, the light wave guide and at least the steel wires closest to the light wave guide are stranded into a cable braid. Stranding steel wires into cable braids enables a damage-free bending around a sheave, since the spiral shape of the wires allows them to introduce the necessary length compensation in the form of relative movements. Further stranding braids into cables generates a double spiral shape, which enables smaller bending radii than would be the case in a spiral cable with a single spiral shape. If not all steel wires of the cable are stranded into a cable braid with the light wave guide, the remaining steel wires can form a spiral cable with the braid containing the light wave guide, for example.

It is especially advantageous for the light wave guide to be clamped in a slip-free manner into a tube that can be or is deformed without any damage, which is surrounded by the steel wires closest to the light wave guide. Arranging the light wave guide in the tube simplifies the production of the cable, since the light wave guide can be displaceably arranged in the tube prior to crimping with the steel wires closest to it, and is only fixed in the tube via crimping. By suitably selecting the material and shape of the tube, the casing surface of the tube can also be used to distribute the radial force applied to the tube by the steel wires over a larger surface of the plastic sheath of the light wave guide, and thereby prevent too high a local pressure on the glass fiber, which would impair the measurement. In addition, the tube affords the light wave guide additional protection against damage. The tube can be made out of plastic or metal, and is preferably plastically deformed via crimping, so as to prevent elasticity from counteracting the radial compressive forces applied by the steel wires.

If the light wave guide with the steel wires or the cable braid that comprises the light wave guide is at least part of a stranded cable, the steel cable can advantageously be used as a cable that runs around a roller, for example for connection with elevator cabins. In order to form a stranded cable, essentially all steel wires are stranded into several braids, and the latter are stranded into a cable. By contrast, steel cables with only one braid as the spiral cable are generally used as a stationary cable not exposed to any rolling motion.

In order to be able to distinguish between temperature-induced and load-induced elongations (strains) of the light wave guide, and thus of the steel cable, it can favorably be provided that at least a second light wave guide displaceable in its longitudinal direction not clamped in by the steel wires closest to it is accommodated between the steel wires for acquiring temperature-induced cable elongations. The second light wave guide is thus also displaceably arranged in the steel cable even with the steel cable in an at least partially crimped state of use. Since the operationally generated cable load is not transferred to the second light wave guide, its elongations acquired by means of suitable measuring processes can be allocated to the temperature influence.

In order to acquire temperature-induced cable elongations (strains), it is especially favorable that the second light wave guide is accommodated in a dimensionally stable tube, and comprises a glass fiber preferably surrounded by a plastic sheath. In an especially expedient embodiment, the second light wave guide is identical in design to the light wave guide provided for crimping purposes. The movability of the second wave guide in its longitudinal direction independently of the cable load is ensured by accommodating it in a dimensionally stable tube, which as opposed to the tube for the crimped or clamped in light wave guide which tube can be deformed without any damage, is not deformed by the crimping process until the second light wave guide has been clamped in.

With respect to the method, the invention provides that the light wave guide be stranded along its longitudinal extension at least with a portion of the steel wires, after which the light wave guide (3, 13) and the steel wires (2, 12) stranded therewith are crimped with each other and thereby compressed along at least a part of the longitudinal extension (Z) of the light wave guide (3, 13) by applying a force acting transversely to the longitudinal extension (Z) of the light wave guide (3, 13), as a result of which the sheath surface of the light wave guide is permanently deformed by the steel wires closest to the light wave guide, and the light wave guide is clamped in between the steel wires closest to it in a slip-free manner, continuously along at least that part of its longitudinal extension, whereupon the light wave guide is possibly stranded with any remaining steel wires. The method serves to produce a steel cable according to the above description. As a consequence, the light wave guide is first stranded with at least a part of the steel wires. It is especially favorable that the light wave guide be arranged in the middle of these steel wires and symmetrically surrounded by the latter. The light wave guide and steel wires stranded therewith are then crimped together and thereby compressed by applying a force that acts radially, i.e., transversely to the longitudinal extension of the light wave guide. Crimping and compression takes place at least along a part of the longitudinal extension of the light wave guide, but preferably along the entire light wave guide and along the entire steel cable. Crimping causes the sheath surface of the light wave guide to become permanently deformed, in particular pressed in, at least by the steel wires closest to the light wave guide, and the light wave guide is continuously clamped in between the steel wires closest to it in a slip-free manner along the crimped section of its longitudinal extension. If the light wave guide was not stranded, crimped and thereby compressed with all steel wires of the steel cable, the light wave guide is subsequently stranded with any remaining steel wires. Because methods for compressing steel wires stranded with each other are known to the expert, this need not be discussed in any greater detail in the specification. In particular, the field of experience of an expert includes performing the compression process so as to fixedly clamp the light wave guide between the steel wires on the one hand, and prevent this from damaging the light wave guide or excessively elevating its light absorption for conducting the measurement on the other hand.

In a preferred embodiment of the method, it is favorable if the light wave guide and at least the steel wires closest to the light wave guide be stranded into a cable braid before compression. This allows the light wave guide to be especially reliably accommodated in the steel cable in a slip-free manner. Of course, more than just the steel wires closest to the light wave guide can be stranded with the light wave guide to form a cable braid.

In order to be able to especially easily accommodate the light wave guide in the steel cable, it is favorable that prior to compression the light wave guide is arranged in a longitudinally displaceable manner in a tube that is to be stranded with the steel wires and can be deformed without damage, and clamping the light wave guide in the tube between the steel wires surrounding it in a slip-free manner by means of the compression. As a consequence, the light wave guide is first accommodated in the tube by being pushed into the tube, or by positioning the casing of the tube next to the light wave guide and then bending it in the form of a tube surrounding the light wave guide. The tube containing the light wave guide is then stranded with at least a part of the steel wires of the steel cable, whereupon the tube is compressed with the stranded steel wires in such a way as to clamp the light wave guide into the tube in a slip-free manner.

For purposes of cost-effectively producing a steel cable that allows a distinction to be made between temperature-induced and load-induced elongations of the light wave guide, and hence the steel cable, it can be provided that at least one second light wave guide that can be displaced in its longitudinal direction and is not clamped in by the steel wires closest to it be stranded with the steel wires for acquiring temperature-induced cable elongations. Therefore, second light wave guide is not crimped with the steel wires. Of course, more than one second light wave guide can also be arranged displaceably in the longitudinal direction in the steel cable for acquiring temperature-induced cable elongations.

The second light wave guide can especially advantageously be arranged displaceably in the longitudinal direction in the steel cable by accommodating the second light wave guide in a dimensionally stable tube. The dimensionally stable tube ensures a displaceability of the second light wave guide during both the production of the steel cable and its operation. The second light wave guide can be accommodated in the dimensionally stable tube before or after stranding the dimensionally stable tube with the steel wires.

The invention will be explained in even more detail below based on preferred, non-limiting exemplary embodiments with reference to the drawing. Shown on:

FIG. 1 is a simplified view of a steel cable with a light wave guide accommodated therein in a longitudinal section;

FIG. 2 is a cross sectional view of a steel cable having several braids, which steel cable in one braid has a light wave guide arranged in a tube;

FIG. 3 is a magnified view of the light wave guide arranged in the tube from FIG. 2;

FIG. 4 is a magnified view of the light wave guide arranged in the tube from FIG. 2 with steel wires of the steel cable, the steel wires being closest to the light wave guide;

FIG. 5 is a cross sectional view of a steel cable having several braids, wherein the braids are different designed than those on FIG. 2, wherein for acquiring the load-induced elongation one braid accommodates a light wave guide arranged in a tube and for acquiring the temperature-induced elongation a second light wave guide arranged in another tube; and FIG. 6 is a magnified view of the light wave guides arranged in the tubes from FIG. 5.

FIG. 1 presents a simplified view of a steel cable 1 with steel wires 2 and with at least one light wave guide 3 surrounded by the steel wires 2, which is provided for acquiring load-induced elongations (strains) of the steel cable 1 or steel wires 2. The steel cable 1 and light wave guide 3 are interruptedly depicted, so as to symbolize the generally large longitudinal extension Z of the light wave guide 3 and steel cable 1 by comparison to their thickness D. Shown at one end E of the steel cable 1 is the light wave guide 3 protruding from the steel cable 1, so as to create an option for connection to a measuring device (not shown) for acquiring elongations of the light wave guide 3.

FIG. 2 shows a cross section of a steel cable 1, with steel wires 2 stranded into several braids, in the present example into braids L1 to L7. The steel cable 1 is hence designed as a stranded cable, which is suitable in particular for applications as a running cable, for example as an elevator cable. However, the steel cable 1 could likewise also be designed as a spiral cable in an embodiment not depicted, in particular for use as a motionless cable. The number of braids L1 . . . L7 can also deviate from the number shown. As also evident based on the partially flattened outer surface A of the steel wires 2' each outwardly arranged in the braids L1 . . . L7, the braids L1 . . . L7 are compressed in design. In an embodiment not depicted, the steel cable 1 could also have just a single compressed braid L1. One of the braids L1 . . . L7, preferably the central braid L1, comprises the light wave guide 3, which is likewise favorably arranged in the middle of the braid L1.

As especially evident from FIG. 3, the light wave guide 3 comprises a light-conducting body, a glass fiber 4 according to the invention, and a sheath (casing) arranged around the glass fiber 4, in particular a plastic sheath 5, with a sheath surface M. The light wave guide 3 is accommodated in a tube 6, wherein an intermediate space 7 remains between the plastic sheath 5, in particular the sheath surface M, and the tube 6, so that the light wave guide 3 is displaceably accommodated in the tube 6 in an unloaded state, i.e., before the light wave guide 3 or tube 6 is crimped with the steel wires 2. The light wave guide 3 and favorably also the tube 6 have a circular cross sectional shape in the unloaded state. The circular shape represents a conventional, uncompressed embodiment of the light wave guide 3 or its plastic sheath 5.

FIG. 2 shows the light wave guide 3 accommodated in the tube 6 in the braid L1 in a state where the light wave guide 3 has been crimped with the steel wires 2 of the braid L1. The light wave guide 3 is hence crimped at least with the steel wires 2" closest to the light wave guide 3, in the present example with all steel wires 2. Provided between the steel wires 2" closest to the light wave guide 3 and the outwardly arranged steel wires 2' are filler wires 2''' with a smaller diameter, so as to turn the braid L1 along with the other braids L2 . . . L7 into filler wire strands overall. Crimping causes the steel wires 2" closest to the light wave guide 3 along with the remaining steel wires 2 of the braid L1 to permanently press against the sheath surface M of the light wave guide 3, as a result of which the cross sectional shape of the sheath surface M of the light wave guide 3 deviates from the unloaded shape depicted on FIG. 3, in particular from the circular shape. As a consequence, the light wave guide 3 is clamped in a slip-free manner between the steel wires 2" closest to it continuously, i.e., essentially without interruptions, along the crimped portion of the longitudinal extension Z, especially preferably along the entire longitudinal extension Z.

The deformation of the sheath surface M of the light wave guide 3 as well as the deformation of the tube 6 due to crimping with the steel wires 2 can be discerned especially distinctly from FIG. 4, which shows a cutout of the braid L1 depicted on FIG. 2. The tube 6 and plastic sheath 5 of the light wave guide 3 are deformed, in particular flattened or impressed, in the contact areas B, in which a respective closest steel wire 2" abuts against the tube 6 and light wave guide 3. In this contact area B, the size of the intermediate space 7 is reduced to zero, and the closest steel wires 2" press against the light wave guide 3 via the tube 6, so as to fixedly and non-displaceably hold the light wave guide 3 in place in the steel cable 1.

FIG. 5 shows another exemplary embodiment of a steel cable 11 with braids L11 . . . L17 comprised of steel wires 12. The outer braids L12 . . . L17 are only schematically denoted, and can have any configuration desired just as on FIG. 2, for example that of a filler braid, and if necessary be compressed. The centrally arranged braid L11 is in any event compressed, and preferably in the middle comprises a light wave guide 13 with a glass fiber 14 and a plastic sheath 15, see also FIG. 6. The light wave guide 13 is displaceably arranged in a tube 16 with the formation of an intermediate space 17 (not shown in detail) in the unloaded, i.e., as yet not compressed, state, and clamped into the tube 16 in a slip-free manner in the compressed state. FIGS. 5 and 6 clearly show that the light wave guide 13 and the tube 16 are surrounded by six steel wires 12" closest to the light wave guide 13 and crimped with the latter in this exemplary embodiment. A second light wave guide 18 is provided in place of one of the filler wires 12''', and accommodated in a dimensionally stable tube 19 in a permanently displaceable manner, even in the compressed state of the braid L11, so that temperature-induced elongations of the steel cable 11 can be acquired. The second light wave guide 18 comprises a glass fiber 20 and a plastic sheath 21, and is not clamped in by the steel wires 12'''' closest to it.

The invention claimed is:

1. A steel cable comprising:
   steel wires for carrying a load; and
   at least one light wave guide provided for detecting load-induced cable elongations of the steel wires, the light wave guide comprising a glass fiber and a plastic sheath surrounding the glass fiber, the light wave guide having a longitudinal extension and a sheath surface;
   wherein the light wave guide is surrounded by the steel wires;
   wherein the steel wires closest to the light wave guide abut against the light wave guide in a cross sectional view, and
   wherein the light wave guide and at least the steel wires closest to the light wave guide are crimped and compressed with each other, as a result of which:
      the closest steel wires permanently press into the sheath surface,
      the cross sectional shape of the sheath surface of the light wave guide deviates from an unloaded shape, in particular from a circular shape, and
      the light wave guide is positively and by force-fit clamped continuously between the closest steel wires in a slip-free manner along at least a part of the longitudinal extension.

2. The steel cable according to claim 1, wherein the light wave guide and at least the steel wires closest to the light wave guide are stranded into a cable braid.

3. The steel cable according to claim 1, wherein the light wave guide is clamped in a slip-free manner into a tube that is or can be deformed without damage, which is surrounded by the steel wires closest to the light wave guide.

4. The steel cable according to claim 2, wherein the light wave guide with the steel wires or the cable braid comprising the light wave guide is at least part of a stranded cable.

5. The steel cable according to claim 1, wherein at least one second light wave displaceable in its longitudinal direction and not clamped in by the steel wires closest to it is accommodated between the steel wires for detecting temperature-induced cable elongations.

6. The steel cable according to claim 5, wherein the second light wave guide is accommodated in a dimensionally stable tube, and comprises a glass fiber preferably surrounded by a plastic sheath.

7. The steel cable according to claim 1, wherein the cross sectional shape of the sheath surface of the light wave guide deviates into a polygonal shape.

8. A method for producing a steel cable with steel wires for carrying a load and with at least one light wave guide provided for detecting load-induced cable elongations of the steel wires, the light wave guide comprising a glass fiber and a plastic sheath surrounding the glass fiber, the method comprising:
   stranding the light wave guide in at least a part of the steel wires along a longitudinal extension of the light wave guide such that the light wave guide is surrounded by the steel wires and such that the steel wires closest to the light wave guide abut against the light wave guide, after the stranding, crimping the light wave guide with the steel wires and thereby compressing the light wave guide and the steel wires along at least a part of the longitudinal extension of the light wave guide by applying a force acting transversely to the longitudinal extension of the light wave guide, as a result of which:

a sheath surface of the light wave guide is permanently pressed in by the steel wires closest to the light wave guide, a cross sectional shape of the sheath surface deviates from an unloaded shape, in particular from a circular shape, and the light wave guide is positively and by force-fit clamped continuously in between the closest steel wires in a slip-free manner along at least the part of the longitudinal extension, and stranding the light wave guide with any remaining steel wires.

9. The method according to claim 8, wherein the light wave guide and at least the steel wires closest to the light wave guide are stranded before compressed into a cable braid.

10. The method according to claim 8, wherein, prior to compression, the light wave guide is arranged in a longitudinally displaceable manner in a tube that is to be stranded with the steel wires and can be deformed without damage, and clamped into the tube between the steel wires surrounding the light wave guide in a slip-free manner via the compression.

11. The method according to claim 8, wherein at least one second light wave guide displaceable in its longitudinal direction and not clamped in by steel wires closest to the second light wave guide is stranded with the steel wires in order to acquire temperature-induced cable elongations.

12. The method according to claim 11, wherein the second light wave guide is accommodated in a dimensionally stable tube.

* * * * *